United States Patent [19]
Baxter et al.

[11] 3,870,342
[45] Mar. 11, 1975

[54] RETRACTABLE KING PIN AND CLAMPING ASSEMBLY

[75] Inventors: Bobby G. Baxter; Theodore B. Splitt, both of Warrenton, Mo.

[73] Assignee: The Binkley Company, Warrenton, Mo.

[22] Filed: Jan. 11, 1973

[21] Appl. No.: 322,640

[52] U.S. Cl. ............................................. 280/433
[51] Int. Cl. ........................................... B62d 53/08
[58] Field of Search ....................... 280/433, 423 R

[56] References Cited
UNITED STATES PATENTS

| | | | |
|---|---|---|---|
| 1,766,780 | 6/1930 | Finch | 280/421 |
| 2,761,699 | 9/1956 | Martin | 280/433 |
| 3,031,206 | 4/1962 | Shinn | 280/433 |
| 3,647,243 | 3/1972 | Nagy | 280/433 |

*Primary Examiner*—Leo Friaglia
*Assistant Examiner*—R. Schrecengost
*Attorney, Agent, or Firm*—Rogers, Ezell & Eilers

[57] ABSTRACT

A trailer coupling having a clamping assembly for a trailer engageable onto a king pin on a towing vehicle such as a pickup truck, the clamping assembly including a positive blocking lock for the clamping jaw positively latching the jaws in coupling position, and the lock being, in turn, positively blocked from unlocking until the blocking means is released, and the king pin being manually movable through the bed of the towing vehicle from a coupling position to a position and condition wherein it makes only a minimal discontinuity in the bed of the towing vehicle.

13 Claims, 12 Drawing Figures

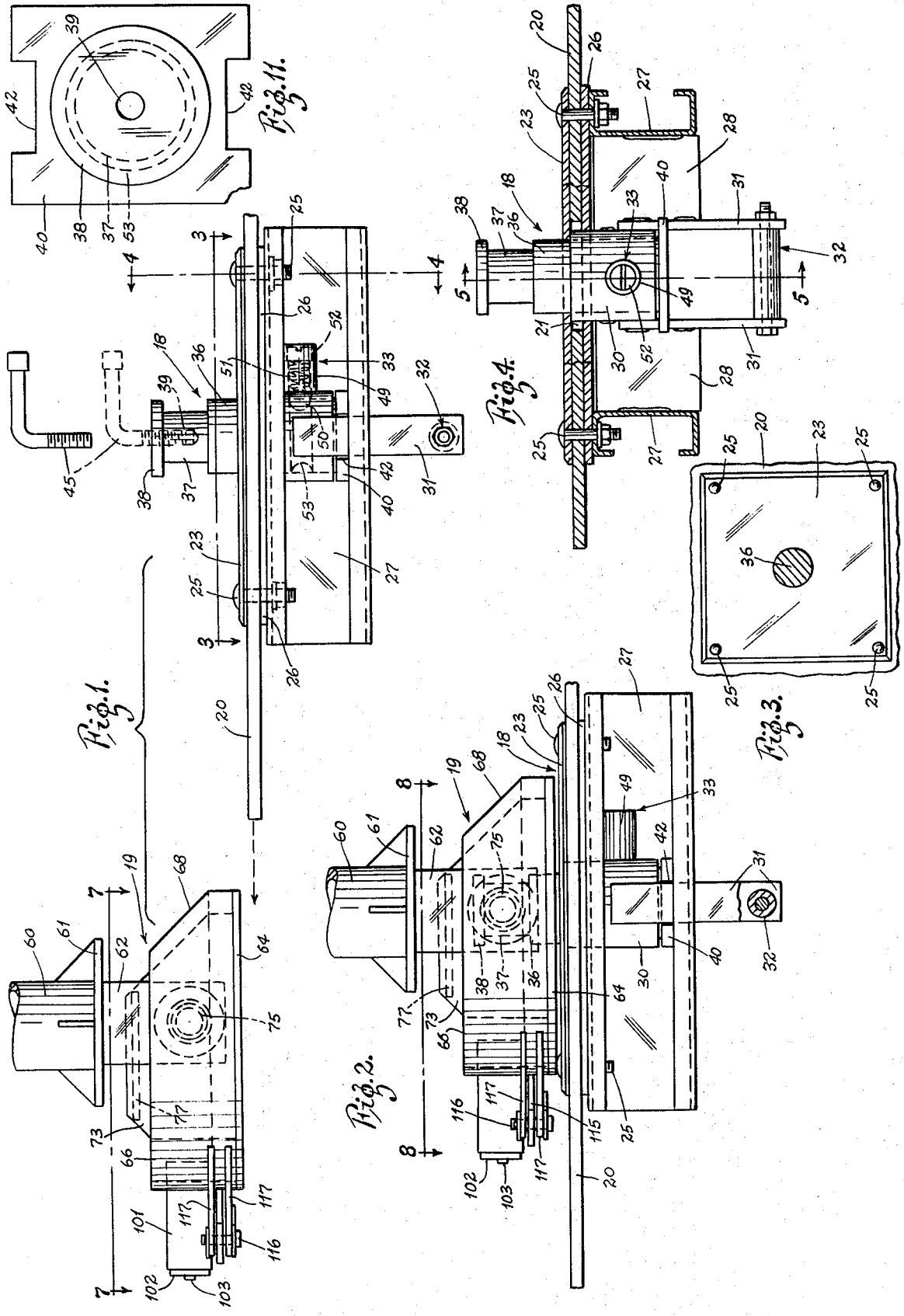

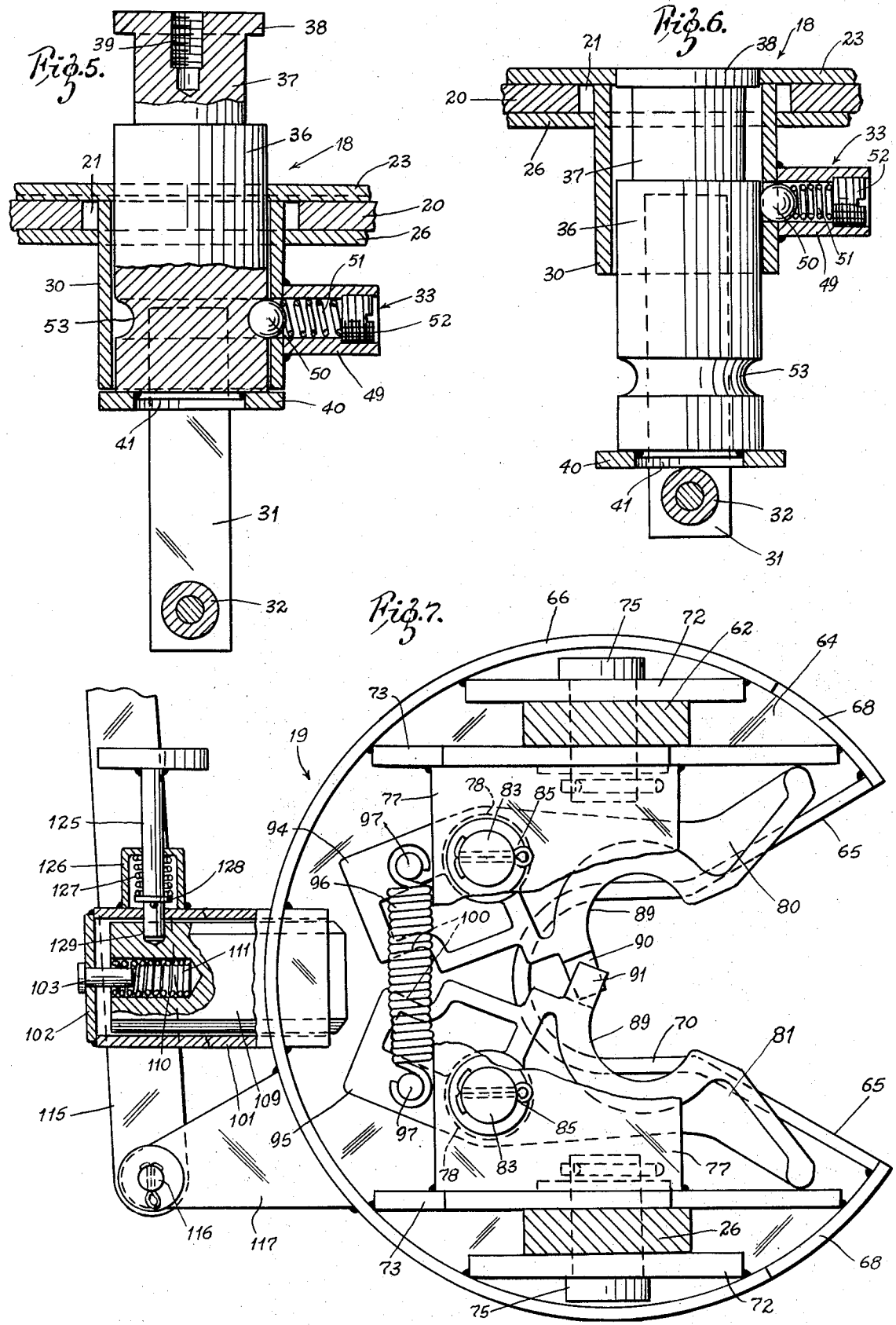

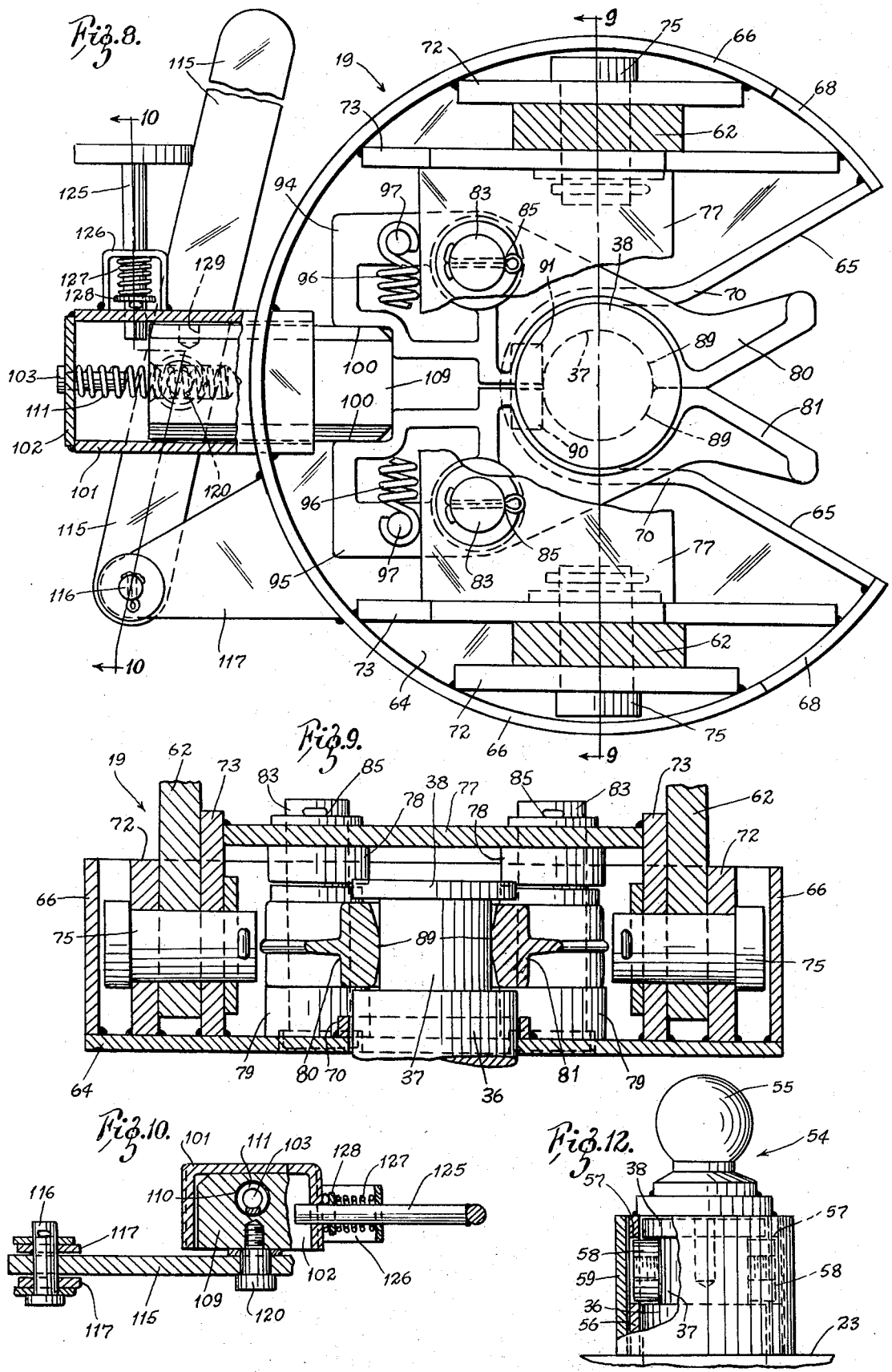

3,870,342

RETRACTABLE KING PIN AND CLAMPING ASSEMBLY

BACKGROUND AND OBJECTIVES

It is an object of this invention to provide a secure trailer coupling that can be incorporated with a towing vehicle such as a pickup truck, without requiring components that interfere with the normal use of the truck. Specifically, an object is to produce a coupler arrangement, the king pin arrangement being mounted on the bed of the towing vehicle, and removable from an operative to a retracted position in which former it is sturdy enough to hold the clamping coupler attached to the trailer, and in which latter it leaves the bed of the towing vehicle substantially unobstructed. In addition, the coupler assembly has jaws interengageable with the king pin, which jaws are positively locked in engaging position, and the lock is positively retained in locking position. This characteristic is especially valuable as the king pin pulls against the open ends of the coupler jaws, which engage around a neck in the king pin, whereon they are retained by an enlarged cap part of the king pin. The king pin is of such design that it is also possible to have a familiar ball-coupler element attached to a sleeve, the sleeve being fittable over the king pin in its operative position and held by a securing element engageable under the cap of the king pin.

While it is old to provide coupling assemblies incorporating pivoted jaws that close around a towing pin of some sort, with a locking means to keep the jaws closed, the former couplers have not had locking blocks interposed between the jaws to lock them positively, along with a positive latch spring-urged into latching position positively obstructing withdrawal of the latch. Nor has the prior art had a king pin arrangement of the type above and hereafter described.

IN THE DRAWINGS

FIG. 1 is an elevation of the fifth wheel coupling arrangement shortly prior to interengagement;

FIG. 2 is an elevation of the fifth wheel coupling arrangement with the components interengaged;

FIG. 3 is a horizontal section on the line 3—3 of FIG. 1 in reduced scale;

FIG. 4 is a vertical section on the line 4—4 of FIG. 1 through the king pin assembly;

FIG. 5 is an enlarged sectional view taken on the line 5—5 of FIG. 4 of the king pin components with the king pin elevated;

FIG. 6 is a view similar to FIG. 5 but with the king pin depressed;

FIG. 7 is a horizontal view partly in section of the fifth wheel coupler components with its jaw open;

FIG. 8 is a view of the fifth wheel assembly again partly in section with the jaws closed;

FIG. 9 is a diametrical vertical section through the fifth wheel assembly taken on the line 9—9 of FIG. 8;

FIG. 10 is a vertical section through the latching mechanism for the actuating parts of the jaw-operating device taken on the line 10—10 of FIG. 8;

FIG. 11 is a top view of the king pin mounted on its stop plate, a corner being broken away; and FIG. 12 is a reduced size elevation, partly in section, of a ball mount that can be employed with the king pin hereof.

DESCRIPTION OF THE PREFERRED EMBODIMENT

The invention incorporates two interoperating components that lock together or are releasable from each other to attach a recreational vehicle or trailer to a tractor or towing vehicle. It is especially useful where the king pin is mounted in the bed of a pickup truck and the trailer is a horse trailer with a gooseneck column or pipe depending vertically below a forward overhang of the trailer that can extend over the bed of the pickup truck. The right-hand portions in FIG. 1 show the king pin assembly 18 for the bed of the towing vehicle or pickup truck and the left-hand portions constitute the coupler 19 mounted on the gooseneck column of a trailer. FIG. 2 shows these parts latched together.

The king pin assembly 18 is adapted to be mounted in the bed 20 of the truck that normally is sheet steel. A hole 21 of appropriate size and shape is cut through the bed 20 and a mounting plate assembly is mounted thereover. The mounting plate assembly comprises a mounting plate 23 that is flat and bevelled at the edges and which extends out for enough to distribute the load properly and to cover the hole 21. Bolts 25 at its corners extend through holes in the truck bed 20 and are secured below by nuts. If desired, a reinforcing backing plate 26, with or without reinforcing channels 27 and connecting panel 28 may be mounted below the bed 20 to further distribute the load transmitted by the bolts 25, and strengthen the coupling, as it is necessary that the king pin attachment to the vehicle be structurally sufficient.

The mounting plate assembly includes a cylindrical sleeve 30 secured as by welding to the under side of the mounting plate 23 at its center. On opposite sides of the lower portion of the sleeve 30 there are two depending rails or straps 31 that are attached together at their lower end by a bolt and sleeve spacer stop arrangement 32. A detent device 33, later to be detailed, projects from the side of the cylindrical sleeve. The hole 21 is cut to a shape that enables the cylindrical sleeve 30 with the straps 31 and detent housing 33 to be inserted through it until the plate 23 rests on the bed 20.

A cylindrical king pin 36 is slidably mounted in the cylindrical sleeve 30 for vertical movements therein. It has a neck 37 in its upper end surmounted by a flat top flange 38 that is a rather close fit in the hole through the plate 23 so that it substantially closes the top of the cylindrical sleeve and lies flush with the top of the plate 23 when it is in its lower position. A threaded hole 39 extends down into the top of the cylindrical king pin 36.

The king pin 36 is welded at its bottom to a stop plate 40 (FIG. 11) that extends transversely beneath the lower end of the sleeve 30. The stop plate has a hole 41 in the bottom to facilitate the welding operation. The stop plate 40 also has notches 42 (FIG. 11) that receive the straps 31 and guide the vertical movement of the king pin and stop plate. When the king pin is in its lower position illustrated in FIG. 6, with the top of the upper flange 38 flush with the top surface of the mounting plate 23, the stop plate 40 rests on the spacer sleeve assembly 32. The king pin can be raised to the upper position of FIG. 5 by insertion of a tool 45 (FIG. 1) into the threaded hole 39 and lifting thereon. It can be releasably detained in the upper position by the detent mechanism 33.

The detent mechanism 33 includes a sleeve 49 welded to the side of the sleeve 30 and projecting transversely therefrom. This sleeve includes a detent ball 50 resiliently urged inwardly by a compression coil spring 51 acting between the ball 50 and a removable plug 52. The ball can engage in a groove 53 peripherally around the king pin 36. By this arrangement, when the king pin is pulled upwardly, it is releasably held in that position by the detent, but may be pushed down manually, the detent then being pushed backwardly out of the groove 53, as will be known in the art. Thus, the king pin assembly provides for a king pin that can be depressed to be substantially flush with the effective top surface of the bed of the truck, or optionally can be pulled up and releasably held in an upwardly projecting position where it can be engaged by the fifth wheel clamping arrangement now to be described.

Or, if desired, a conventional ball hitch can be used. In FIG. 12, a ball coupler assembly 54, including a ball 55, secured to a hollow sleeve 56, is slipped over the elevated king pin 36. The sleeve portion has opposite circular holes 57 through it. Cylindrical locking discs 58, with axial threaded holes through them are inserted into the holes 57. The discs have a diameter sufficient to extend substantially from top to bottom of the king pin neck 37, and a thickness to insure that they will stick out from the king pin into the holes 57.

After the discs are installed, a cylindrical sleeve is slipped around the outside of the assembly. It prevents removal of the discs 58 from their illustrated positions.

With the foregoing arrangement of parts, the king pin is prepared to receive a conventional socket joint element over the ball 55. It can be reconverted to receive the jaw coupler by lifting the ring or sleeve 59, removing the discs 58 and lifting the ball assembly 54 from the king pin. The discs 58 have threaded openings into which the handle or tool 45 can be screwed, so that they can be removed if they stick.

As already noted, the conventional trailer of the type here involved has a gooseneck tube 60 depending from an overhang thereof. This tube comes down to approximately the bed level of the towing vehicle so that a connection can be made for pulling the trailer.

The clamping assembly includes an attaching plate 61 that is welded to the gooseneck 60 with reinforcing gussets, so that the plate 61 is rigidly mounted on the lower end of the gooseneck. The attaching plate 61 has two parallel lugs 62 depending from its opposite ends, giving it a trestle shape.

A clamp support assembly is hung on the lower ends of the two depending lugs 62 for limited rocking movement. It comprises a base plate assembly having an arcuate plate 64 provided with a sectorial receiving mouth 65 extending inwardly to a generally semicircular inner portion 66 that is of a size to embrace the reduced portion 37 of the king pin as will appear. The plate 64 has an upstanding rim 66 around its outer perimeter. The forward edges of the rim 66 slope downwardly as shown at 68. A lower rim 70 extends around its perimeter of the entrance or mouth 65.

The base plate 64 has upstanding pairs of spaced walls arranged on its opposite sides. These include outer walls 72 and inner walls 73 all being welded securely in vertical position on the base plate. The outer walls 72 extend upwardly as high as the flanges 66 on the base plate (FIG. 9). The inner walls 73 extend above the flanges 66 and slope at their forward and rear corners. Each of the two depending lugs 62 on the supporting plate 61 extends downwardly between a pair of the walls 72 and 73. Pins 75 are mounted through holes in each plate 72, lug 62 and plate 73 and held therein by appropriate washers and cotter pins. These pins 75 suspend the clamp assembly onto the attaching plate 61, with limited rocking movement about a transverse axis.

A jaw bearing plate assembly spans between the two vertical support plates 73. This comprises a plate 77 welded to the upper portions of the plates 73. This bearing plate 77 has two spaced vertical journal upper bearings 78 supported on it. Opposite and coaxial with the upper bearings 78 on the plate 77 are two lower journal bearings 79 on and extending upwardly from the bottom base plate 64.

A pair of clamping jaws generally designated 80 and 81 with bearing holes through them are mounted one between each pair of bearings 76 and 79, and bearing pins 83 with enlarged heads at their lower ends pass through the base plate 64, the bearings 79, the clamping jaws, the bearings 76 and the plate 77. Above the plate 77 there are appropriate cotter pin and washer devices 85 to retain the bearing pins in place. By this arrangement the clamping jaws 80 and 81 can rock toward and away from each other.

The two clamping jaws are the same, but the left jaw is inverted with respect to the right jaw. As shown in FIG. 8, when the jaws are clamped together, their forward ends have sloping diverging walls. When the jaws are open, these sloping diverging walls give access to the entering king pin, as illustrated in FIG. 7. The clamping jaws also have substantially semicircular mid-portions 89 that come together as shown in FIG. 8 to embrace and closely surround the collar portion 37 of the king pin 36. The rear parts of these arcuate portions 89 are formed with two transverse tangential and overlying lugs 90 and 91. Since these are transverse to the line of entry of the pin 35 into the jaws when the jaws are closed, they project forwardly when the jaws are open, and as illustrated in FIG. 7, are in the path of an entering king pin. Since they are eccentric to the pivot pins 83, the force of the king pin upon the two projections 90 and 91 pivots the respective jaws from the open position of FIG. 7 to the closed position of FIG. 8.

The two jaws 80 and 81 have similar tail portions 94 and 95 projecting to the rear of the pins 83. These portions are connected by a tension coil spring 96 attached to pins 97 that are secured to and extend upwardly from the respective jaws. The force of this spring yieldably holds the jaws open, until they are closed by the force of the king pin 36 on the lugs 90 and 91.

Means are provided to latch the jaws in the closed position and to hold them thus latched about the king pin against the force of the pulling applied against the opening or forward ends of the jaws. The latching mechanism involves right-angular recesses 100 in the tail ends of the jaws. When the jaws are closed, the recesses outline a generally rectangular space between the jaws. A locking block is movable into this space.

The locking block is part of an assembly mounted upon the rim or flange 66. It includes a block housing 101 of inverted U-shaped cross-section that extends through an opening in the flange 68 and is welded to the flange. The outer end of this housing 101 is closed by a cap 102, to which an inwardly projecting pin 103 is secured.

A locking block 109 slides within the housing 101. Its lower surface rests upon the lower edge of the opening through the flange 68. It has a hole 110 drilled into its outer end, with a coil compression spring 111 within this hole and acting between the block and the cap 102 whereon it is retained by a pin 103. The spring urges the block forwardly toward the jaws.

An actuating lever 115 has its end pivoted on a pin 116 mounted through two parallel superposed ears 117 that are welded to and extend outwardly from the outer surface of the flange 68. Appropriate washers and a cotter key hold the lever in place.

The lever 115 has an opening at an intermediate point. A pin 120 extends upwardly through the opening, passes through a washer, and is threaded into the under side of the locking block 109. As will be evident from FIG. 8, rocking of the lever 115 about the pin 116 causes the pin 120 to displace the block 109 forwardly and backwardly. It is normally urged forwardly by the compression spring 111. If it is in its forward position and the jaws are closed, the block 109 enters the angular recesses 100 as shown in FIG. 8, and completely and positively blocks reopening of the jaws.

Latch means are provided for holding the block 109 in either its locking or released positions. To this end the lock block housing 101 has an opening in one side, through which the shaft of a T-handle assembly 125 extends. Outside the housing 101, a U-shaped bracket 126 is welded. A compression spring 127, as illustrated in FIG. 8, is mounted around the T-handle shaft within the U-shaped bracket 126, and acts between the bracket and a washer 128 that is held by a pin on the shaft. The spring 127 thus urges the T-handle shaft inwardly of the housing 101 toward the main axis of the locking block 109.

The locking block 109 has a recess 129 in it into which the shaft of the T-handle can fit when the block is in its retracted position, thus locking the block in jaw-releasing position. When the block 109 is in its jaw-locking position illustrated in FIG. 8, the pin of the T-handle 125 is urged inwardly by its spring and slips behind the block 109, preventing that block from being moved to a jaw-unlocking position, giving a positive lock against inadvertent opening of the jaws.

OPERATION

The clamping assembly is attached to the gooseneck tube by bringing it up to the gooseneck and fitting the vertical walls 72 and 73 onto the depending lugs 62, and fastening them with the pins 75. The clamping assembly is somewhat rockable about the pins 75, to accommodate travel of towing vehicle and trailer over humps in the road.

Before connecting a trailer to the king pin, the king pin is in its lower position illustrated in FIG. 6, wherein its upper surface is completely flush with the plate 23 and there is substantially no interruption of the smooth bed of the truck. To ready the king pin for coupling, the handle 45 is threaded into the hole 39 and the pin is pulled up until the detent ball 50 engages in the groove 53 and holds the pin up. The handle 45 is then removed. In this, the king pin is held against rotation by the plate 40 which is guided by the straps 31.

At this time, on the trailer itself, the handle 115 is rocked rearwardly and the block 109 is retracted wherein it is automatically held, as the spring 127 forces the T-handle pin 125 into the recess 129 in the block. Under these circumstances, the tension spring 96, acting through the pins 97, rocks the jaws 80 and 81 into their open position, which moves their two lug portions 90 and 91 to project forwardly, as illustrated in FIG. 7.

To connect the trailer and truck, the T-handle 125 is retracted, letting the spring 111 move the block 109 toward the jaws, where it can rest against their back ends. The truck is backed until the king pin 36 enters the opening 65 of the coupler. As the truck moves backwardly, the pin is guided in this opening 65 of the coupler, moving the forward end of the trailer to one side of the other as necessary. The action also may rock the coupler about the axis of the pins 75, but this movement is limited, and as the pin reaches the semi-cylindrical parts 89 of the jaw openings, it is substantially on the axis of the pins 75. As the king pin moves back in the coupling portion of the jaws, it engages the two projections 90 and 91, pressing them further backwardly. As shown in FIG. 9, the jaws have a vertical thickness about equal to the vertical dimension of the neck 37 of the king pin, and when the king pin 36 is elevated, the neck part is raised above the towing vehicle bed a distance to correspond to the level of the jaws, tilting the jaws to closed position against the tension spring 96 and bringing the recesses 100 into rectangular positions.

The compression spring 111 thrusts the block 109 forwardly to enter the rectangular recess 100 in the blocking position of FIG. 8. This does not require the operator to move the handle 115, although if for any reason the parts have become fouled by foreign matter, the handle can be used to assist the action.

As the block 109 reaches its locking position, the compression spring 127 forces the T-pin 125 inwardly behind the block 109 so that the block cannot move outwardly. The two jaws 80 and 81 are locked firmly together and the coupling is complete. Thereafter, when the truck moves forwardly, it pulls the trailer, with the transmission of traction from the truck through the king pin, the coupler jaws and the associated parts, to the gooseneck and the trailer.

It will be noted that the pull on the jaws is essentially transmitted along the axes of the two pins 75. The jaws are slightly rounded on their inner surfaces where they engage the pin in the shoulder 37 as illustrated in FIG. 9 to permit a degree of rocking motion without significant lost motion. This permits enough articulation of truck and trailer to accommodate road humps.

When uncoupling is desired, the truck is stopped, the operator pulls out the T-handle 125 against the spring 127, grasps the lever 115, and withdraws the block 109 from its position between the tails of the jaws. When the locking block 109 is fully withdrawn, the operator releases the handle 125 and its spring forces it to engage the recess 129 and lock the block in its open position. Meanwhile, withdrawal of the block from the recesses 100 permits the coil spring 96 to snap the jaws 80 and 81 open, whereupon the truck can be driven away from the trailer. Then the operator, with his foot or otherwise, depresses the king pin 36, releasing the detent mechanism 48, and forcing the pin down until its bottom plate 40 strikes the connecting spacer sleeve arrangement 32 as shown in FIG. 6. This leaves the bed of the towing vehicle substantially unobstructed.

Various changes and modifications may be made within this invention as will be readily apparent to those skilled in the art. Such changes and modifications are within the scope and teaching of this invention as defined by the claims appended hereto.

What is claimed is:

1. In a coupler for use with a towing vehicle and a trailer: a king pin assembly including a king pin holder adapted to be mounted on the bed of the towing vehicle and a king pin mounted therein for vertical movement from a retracted position to a position wherein it stands up from the bed of the vehicle a predetermined distance, and a coupler assembly engageable with the king pin in its upwardly extended position; the coupler assembly having a base and jaw means positioned above the base a distance to correspond to the elevation of the king pin, the king pin holder comprising a mounting plate adapted to overlie a part of the bed of the vehicle and a sleeve depending therefrom, the king pin being manually movable from a retracted position flush with the mounting plate to the projecting position, and spring detent means for releasably retaining the king pin in projecting position, said means comprising interengaging components on the king pin and sleeve that are disengaged when the king pin is retracted, so that it may remain in retracted position.

2. In a coupling attachment for mounting on the bed of a vehicle such as a truck: a mounting plate adapted to overlie a bed or like part of a truck, which bed has a hole therethrough, a sleeve secured to and extending transversely from the plate, the plate having a hole over the top of the sleeve; a king pin slidably mounted in the sleeve and movable therein from a retracted position within the sleeve to a projecting position wherein it projects through the mounting plate hole outward of the plate and means in the coupling yieldably retaining the king pin in one of its positions, said means comprising interengaging components on the king pin and sleeve that are disengaged when the king pin is moved from its one position to its other position.

3. In the coupling attachment of claim 2: blocking means limiting retracting movement of the king pin to prevent its being expelled from the sleeve when it is moved into its retracted position, the blocking means including a member secured to and supported on the sleeve, and extending inwardly therefrom across the path of movement of the king pin.

4. In the coupling attachment of claim 3: the said blocking means limiting movement into retracted position to such amount as will dispose the projectable end of the king pin even with the mounting plate.

5. In the coupling attachment of claim 3: the said limiting means comprising at least one strap-like member projecting from the sleeve parallel to its axis on its end opposite the mounting plate, a cross stop extending from the strap-like member into the path of retracting movement of the king pin, to be engaged by the king pin and thereby to limit its movement.

6. In the coupling attachment of claim 5: there being two such strap-like members on opposite sides of the sleeve, with the cross-stop extending between and connected to them, and means on the king pin engageable slidably with at least one of the strap-like members to restrict the movements of the king pin to linear movements free of any substantial rotary movements.

7. In the coupling of claim 2: the means for yieldably retaining the king pin comprising a spring-urged device supported on the coupling attachment and engageable with the king pin to hold it in projecting position, but yieldable to a force applied to the king pin to enable the king pin to be retracted.

8. In the coupling of claim 7, the spring-urged device comprising a rounded detent member, mounted on the sleeve and confined thereto, for limited movement laterally toward and from the king pin, a spring supported on the sleeve and yieldably urging the detent member toward the king pin, and a recess in the side of the king pin engageable by the rounded member when the king pin is in projected position.

9. In the coupling attachment of claim 2: reinforcing means including backup means adapted to be disposed below the bed of the vehicle and having an extent to be connected to the mounting plate on opposite sides of the sleeve, so as to distribute forces tending to pull the device off the bed of the vehicle over a substantial area.

10. In the coupling attachment of claim 9: the reinforcing means including beam-like members adapted to be mounted below the bed of the vehicle, the beam-like members being located on opposite sides of the sleeve and extending along opposite edges of the mounting plate, and attachable to the mounting plate by attaching means that extend through the bed of the vehicle.

11. In the coupling attachment of claim 10: the beam-like members being connected to the sleeve by gussets secured to the beam-like members and the sleeve.

12. In the coupling attachment of claim 8, the king pin having an opening in its projectable end with means in the opening to receive and hold a pulling tool by which the king pin may be drawn into projecting position, and means to prevent rotation of the king pin in the sleeve.

13. In a coupling attachment for mounting on the bed of a vehicle such as a truck: a mounting plate adapted to overlie a bed or like part or a truck, which bed has a hole therethrough, a sleeve secured to and extending transversely from the plate, the plate having a hole over the top of the sleeve; a king pin slidably mounted in the sleeve and movable therein from a retracted position within the sleeve to a projecting position wherein it projects through the mounting plate hole outward of the plate and means in the coupling yieldably retaining the king pin in its outward position, reinforcing means including a backup plate adapted to be secured to the mounting plate below the bed of the vehicle, the backup plate having a hole to receive the sleeve.

* * * * *